March 21, 1961 H. SCHMIDT 2,975,789
CURRENCY DISPENSING APPARATUS
Filed July 14, 1954 9 Sheets-Sheet 1

Inventor:
HERMANN SCHMIDT
BY:

March 21, 1961 H. SCHMIDT 2,975,789
CURRENCY DISPENSING APPARATUS
Filed July 14, 1954 9 Sheets-Sheet 2
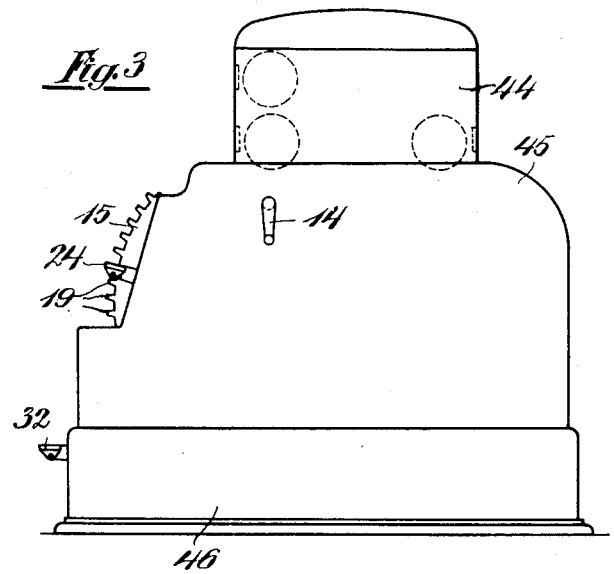
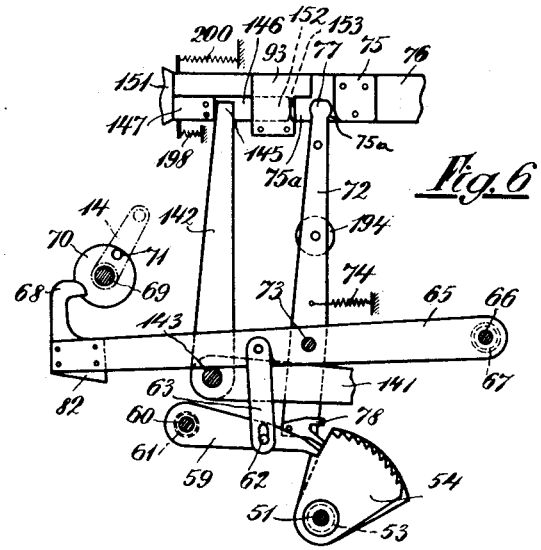
Inventor:
HERMANN SCHMIDT
BY:

March 21, 1961 H. SCHMIDT 2,975,789
CURRENCY DISPENSING APPARATUS
Filed July 14, 1954 9 Sheets-Sheet 3
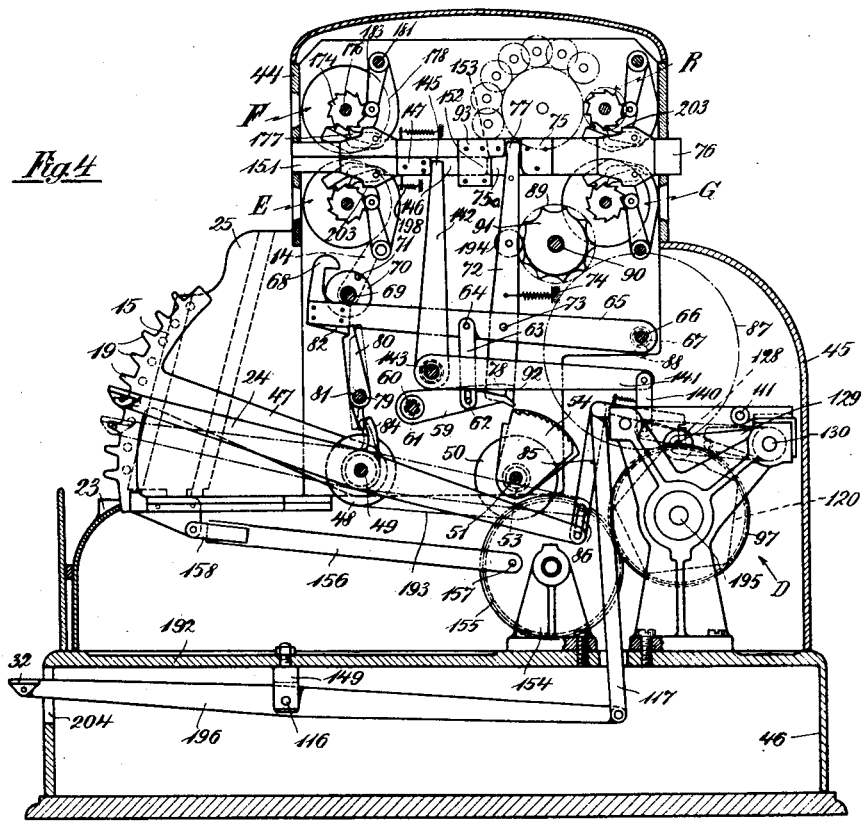
Inventor:
HERMANN SCHMIDT
BY:

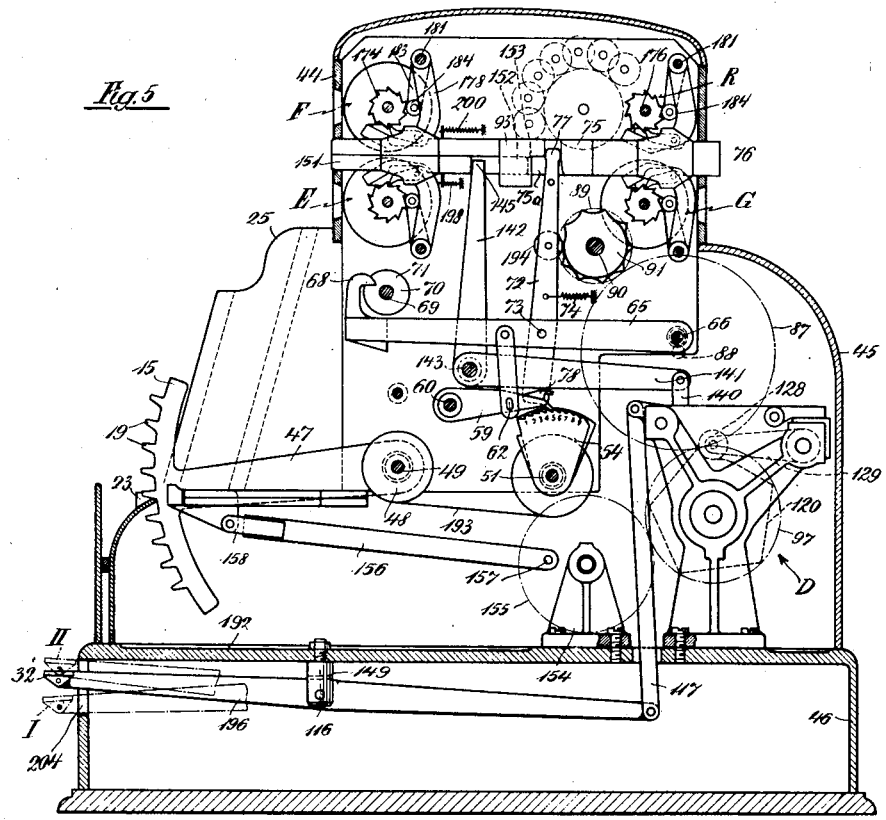

March 21, 1961 H. SCHMIDT 2,975,789
CURRENCY DISPENSING APPARATUS
Filed July 14, 1954 9 Sheets-Sheet 5
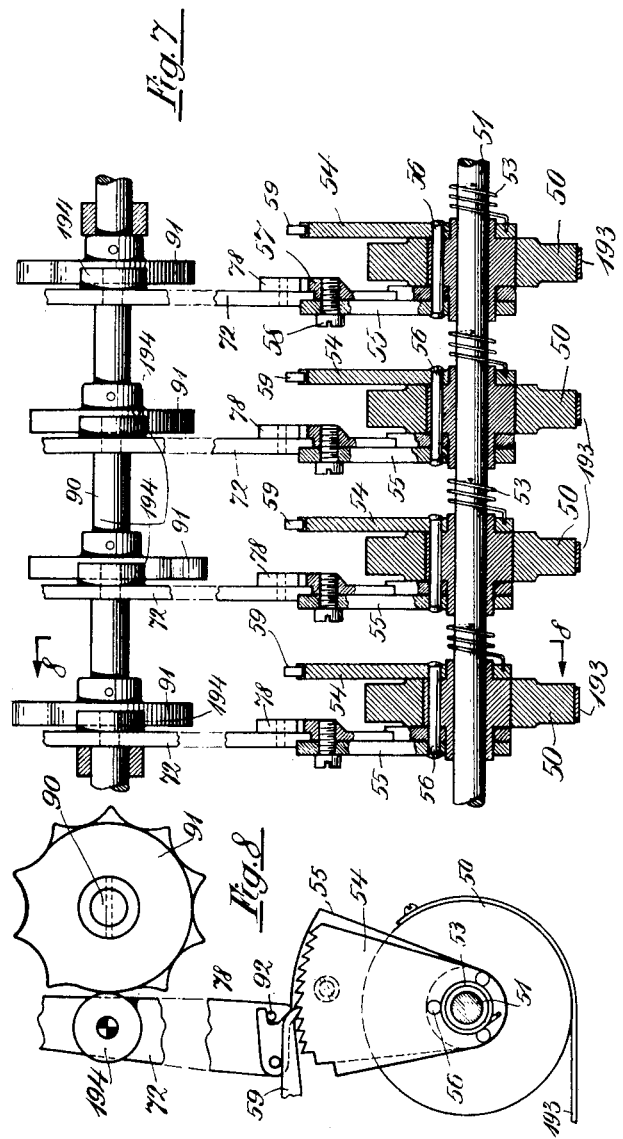
Inventor:
HERMANN SCHMIDT
BY:

March 21, 1961 H. SCHMIDT 2,975,789
CURRENCY DISPENSING APPARATUS
Filed July 14, 1954 9 Sheets-Sheet 6
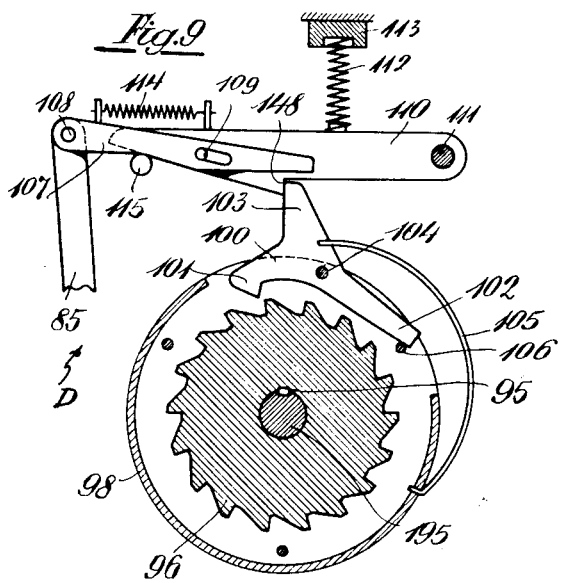
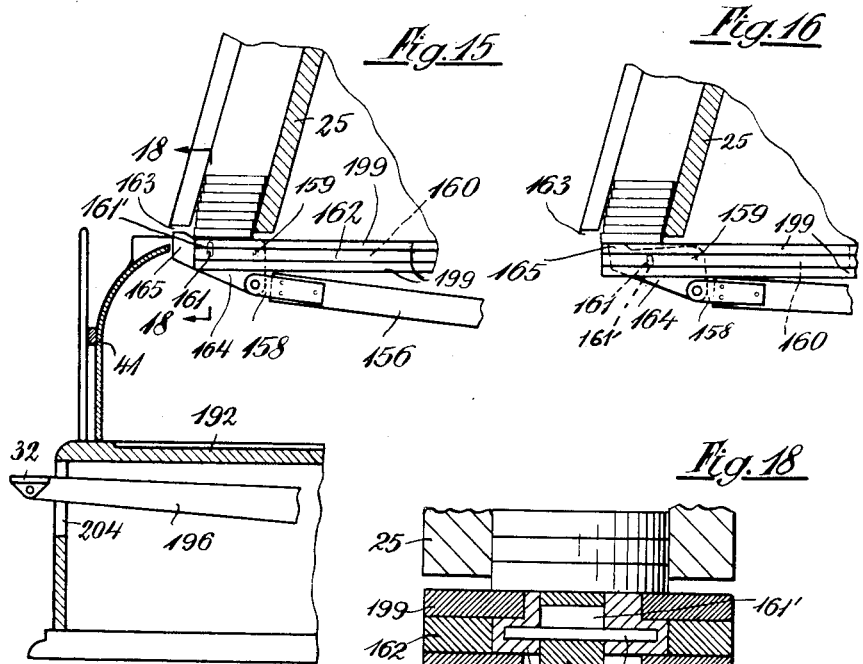
Inventor:
HERMANN SCHMIDT
BY March 21, 1961 H. SCHMIDT 2,975,789
CURRENCY DISPENSING APPARATUS
Filed July 14, 1954 9 Sheets-Sheet 7
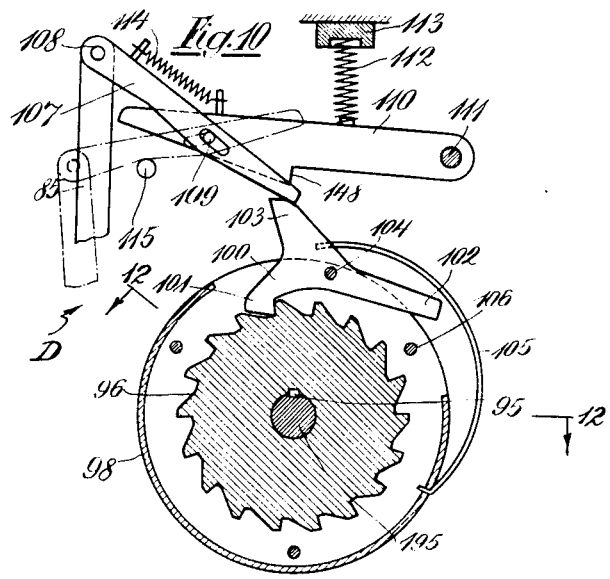
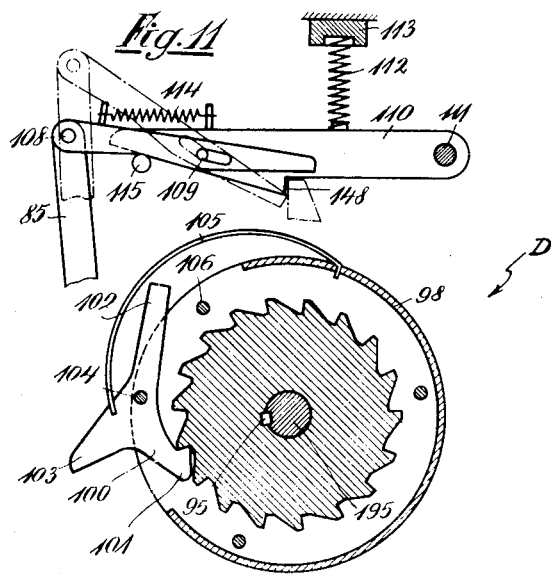
Inventor:
HERMANN SCHMIDT
BY:

March 21, 1961
H. SCHMIDT
2,975,789
CURRENCY DISPENSING APPARATUS
Filed July 14, 1954
9 Sheets-Sheet 8
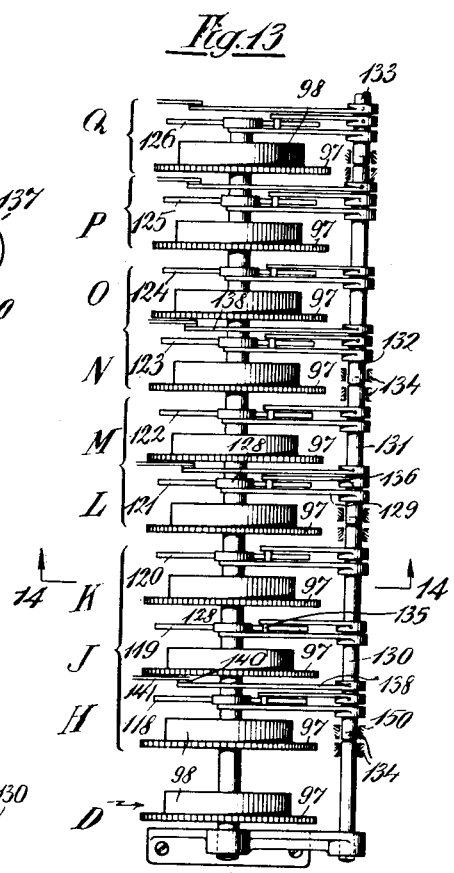
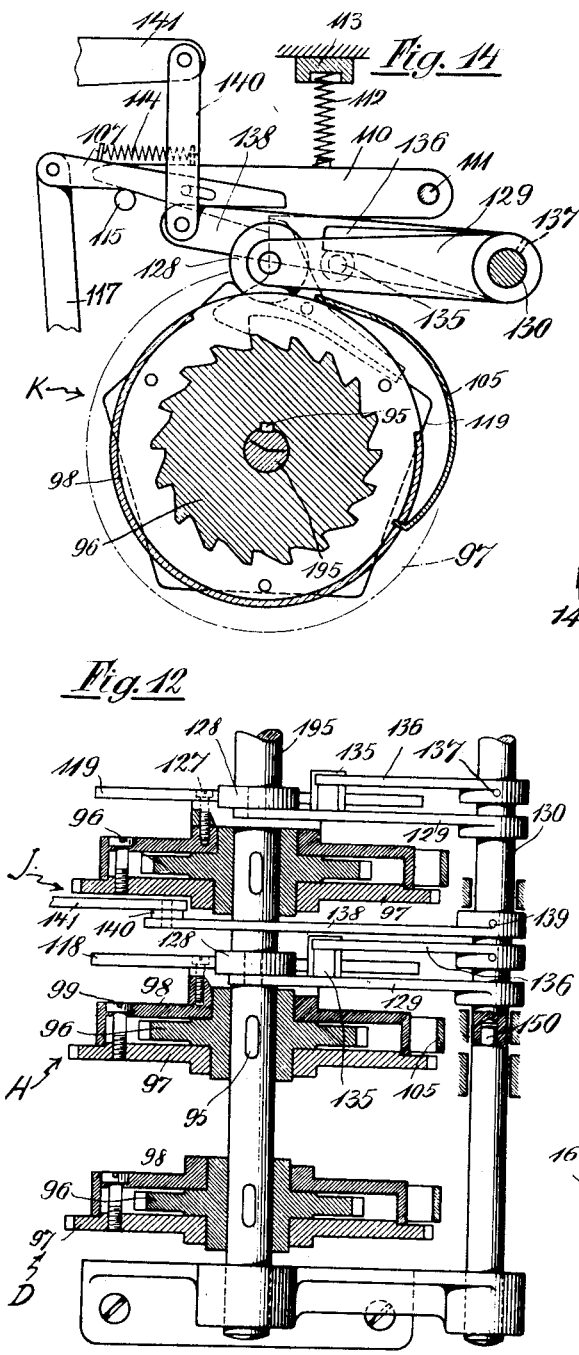
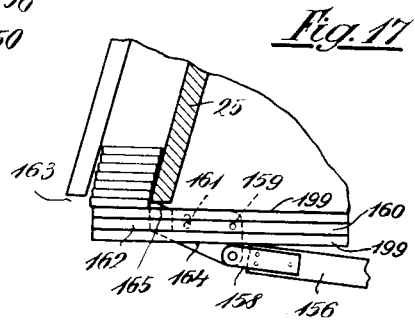
Inventor:
HERMANN SCHMIDT
BY:

March 21, 1961   H. SCHMIDT   2,975,789
CURRENCY DISPENSING APPARATUS
Filed July 14, 1954   9 Sheets-Sheet 9
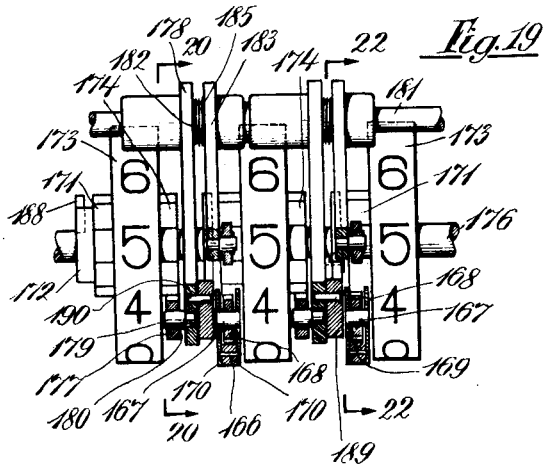
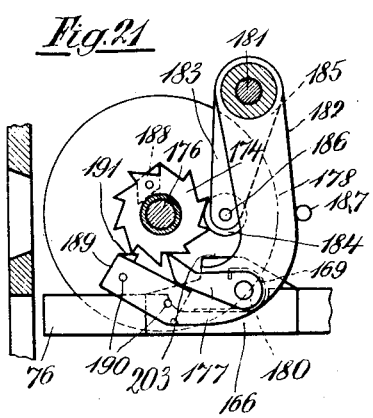
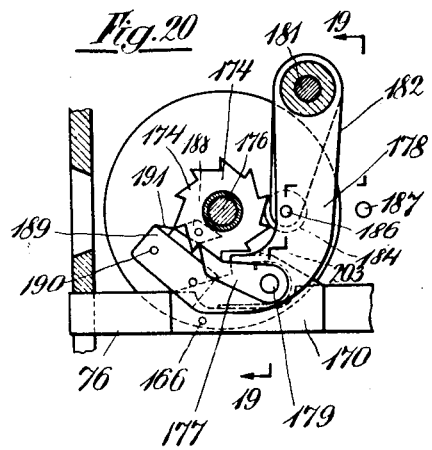
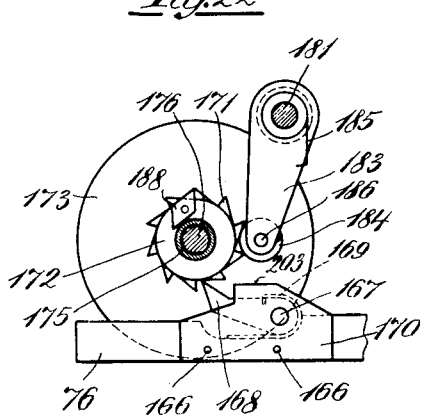
Inventor:
HERMANN SCHMIDT
BY:

United States Patent Office 2,975,789
Patented Mar. 21, 1961

2,975,789
CURRENCY DISPENSING APPARATUS
Hermann Schmidt, 36 Wilhelm-Blosstrasse,
Ludwigsburg, Germany
Filed July 14, 1954, Ser. No. 443,329
Claims priority, application Germany July 17, 1953
18 Claims. (Cl. 133—2)

The present invention relates to currency dispensing apparatus, and more particularly to a combined currency dispensing and indicating machine.

Currency dispensing machines are known in which amounts of currency are dispensed in the form of bills or coins. In the known machines of this type, keys corresponding to the total amount of money which is to be dispensed are actuated whereupon the amount is dispensed from the machine. The known currency dispensing machines have the disadvantage that the amount to be dispensed is not indicated. A further disadvantage of the known machines resides therein that the operator cannot select the currency denominations which are dispensed. Moreover, in the machines of the known art, all currency denominations, in other words, all types of coins and bills have to be stored in sufficient amounts since it is not possible to select the currency denominations, or more particularly the coins or bills which are to be dispensed.

It is one object of the present invention to overcome the disadvantages of the known currency dispensing machines and to provide a currency dispensing apparatus in which the currency dispensing means are coupled to indicating means for indicating the amount of dispensed currency.

It is another object of the present invention to provide a totalizer connected to the currency dispensing means and including indicating means so that dispensed amounts may be totalized and indicated.

It is a further object of the present invention to provide first operating means for introducing into the totalizer a first amount, for instance, the amount of a purchase, and to automatically add in the totalizer the amount dispensed by the currency dispensing means so that the totalizer registers a total amount which corresponds to the amount given by the customer to the cashier so that the cashier may check whether the change dispensed to the customer is correct.

It is a still further object of the present invention to connect indicating means to the above described totalizer so that the total amount, corresponding to the amount given by the customer to the cashier, is indicated when the cashier has dispensed the correct amount of change.

It is yet a further object of the present invention to provide containers for each currency denomination, and dispensing means associated with each container so that the operator can select the currency types which are dispensed within a currency denomination to the customer in accordance with the coins and bills stored in the machine.

It is a still further object of the present invention to provide a motor driven drive means for mechanically operating the mechanism of the machine so that the operator only actuates the drive means.

With these objects in view, the present invention mainly consists in a currency dispensing apparatus which comprises, in combination, totalizer means, first operating means for introducing into the totalizer means a first amount which is registered by the totalizer means, second operating means for introducing into the totalizer means a second amount so that the totalizer means totalizes the first and second amounts and registers a third amount, and currency dispensing means for dispensing said second amount and being connected to the second operating means so as to be actuated by the same simultaneously with the totalizer means.

Preferably indicating means are connected to the totalizer means for indicating the first amount, and the third amount.

Preferably the totalizer means include at least two totalizers, one totalizer being connected to indicating means which indicate the amount of the purchase, and the other totalizer indicating first the amount of the purchase, and then the sum of the amount of purchase and the amount of change dispensed by the cashier so that second indicating means connected to the other totalizer finally indicate the amount given by the customer to the cashier, for instance a larger bill which is to be changed.

According to a preferred embodiment of the present invention, coupling devices are provided for connecting manually operated levers with a motor driven drive shaft. Motion transmitting means connect the coupling devices in coupled position with actuating means for actuating the totalizer means.

Preferably a plurality of coupling devices is provided for each denominational order, one coupling device being provided in each denominational order for each currency denomination. The coupling devices in each denominational order, for instance each decimal order, operate a motion transmitting system common to each decimal order so that regardless of which currency denomination within one decimal order is dispensed, the respective decimal order of the totalizer means is actuated.

According to a preferred embodiment of the present invention one totalizer and indicating means is provided on the side of the machine facing the operator, and one totalizer and indicating means is provided on the side of the machine facing the customer for indicating the amount of the purchase.

A further totalizer and indicating means is arranged on the side of the machine facing the operator. On this totalizer the dispensed amount is added to the amount of purchase so that the operator can check whether a correct amount has been dispensed as change.

In order to dispense currency denominations in any desired order, the totalizers according to the present invention are so constructed that each decimal order can be actuated in any desired sequence. According to a preferred embodiment of the present invention, each totalizer has in each decimal order at least one stepping wheel having ten teeth. The stepping wheels are operated from the operating means, and each stepping wheel is provided with a tens-transfer means for shifting the stepping wheel of the next higher decimal order one step after ten steps of the stepping wheel of the next lower decimal order.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a side view of the machine shown in Fig. 1;

Fig. 4 is a cross-sectional view of the machine shown in Fig. 1 on an enlarged scale and in a first position;

Fig. 5 is a cross-sectional view corresponding to Fig. 4 and showing the machine in another position;

Fig. 6 is a cross-sectional view corresponding to Fig. 4 and showing the machine in a third position;

Fig. 7 is a fragmentary front view of a detail shown on an enlarged scale;

Fig. 8 is a fragmentary sectional view of the detail shown in Fig. 7 taken on line 8—8 in Fig. 7;

Fig. 9 is a side view of a coupling device used in the machine;

Fig. 10 is a side view of the coupling device shown in Fig. 9 in another operational position;

Fig. 11 is a side view of the coupling device shown in a further operational position;

Fig. 12 is a sectional view on line 12—12 in Fig. 10 showing coupling devices on an enlarged scale;

Fig. 13 is a plan view of a set of coupling devices provided in the machine;

Fig. 14 is a sectional view taken on line 14—14 in Fig. 13 illustrating a detail of the motion-transmitting means for operating a totalizer;

Fig. 15 is a side view of a coin dispenser provided in the machine and shown in position of rest;

Fig. 16 is a side view of the coin dispenser in partly retracted position;

Fig. 17 is a side view of the coin dispenser shown at the beginning of a dispensing operation;

Fig. 18 is a sectional view through the coin dispenser taken on line 18—18 in Fig. 15;

Fig. 19 is a front view of a totalizer mechanism partly in section taken on line 19—19 in Fig. 20;

Fig. 20 is a sectional view taken on line 20—20 in Fig. 19;

Fig. 21 is a view corresponding to Fig. 20 showing a different operational position; and Fig. 22 is a sectional view taken on line 22—22 in Fig. 19.

Figure 1:
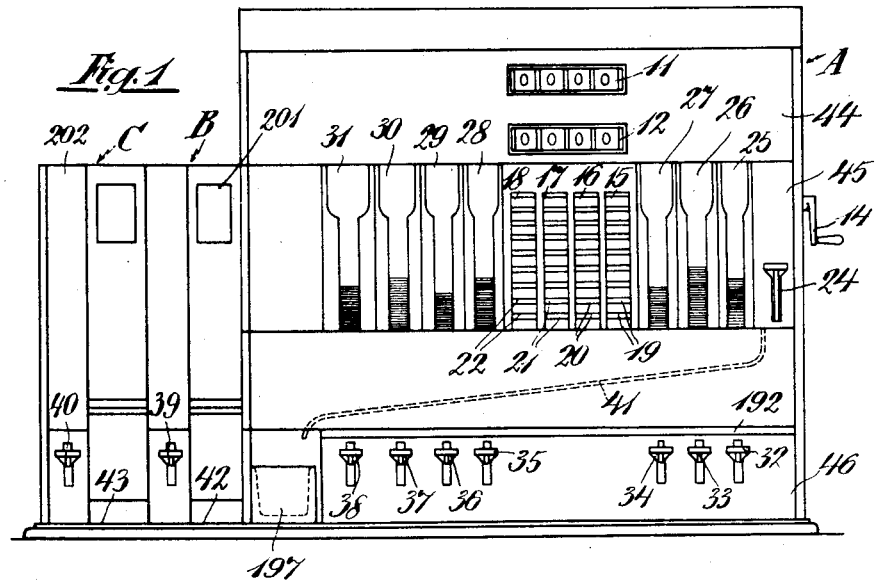
Fig. 1 is a front view of a machine according to the present invention as seen by the operator.
Figure 2:
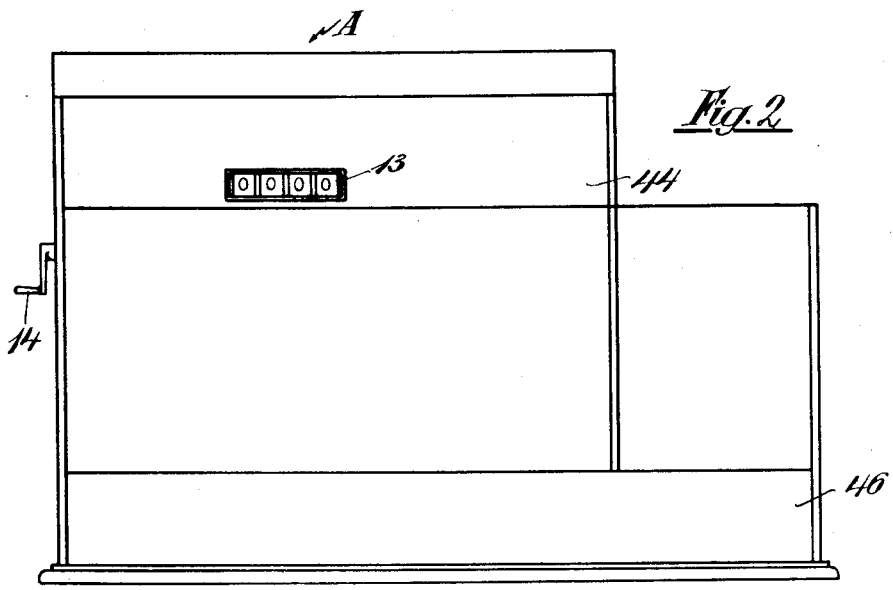
Fig. 2 is a rear view of the machine shown in Fig. 1 as seen by a customer.

Referring now to the drawing, more particularly to Figs. 1 and 3, the machine according to the present invention comprises a coin dispensing unit A, and two bill dispensing units B and C which are combined with the coin dispensing unit A. The bill dispensing units B and C are provided with windows 201 and 202 through which it can be ascertained whether bills are stored in the respective bill dispensing unit.

The coin dispensing unit A is arranged in a housing which includes an upper part 44, a middle part 45 and a bottom part 46. On the side of the machine facing the operator, two windows 11 and 12, and on the opposite side which faces the customer, one window 13 is provided behind which indicating numbers appear when the machine is operated.

In the embodiment illustrated in the drawing, window space for only four decimal orders is provided so that two positions are available for cents, and two positions are available for dollars. The maximum number which can be indicated is consequently 9999, that is, $99.99. Of course for different types of currency, the arrangement is slightly varied.

A clearing crank handle 14 is provided on the right side of the machine for returning the totalizers and indicating means into zero position.

Digit selecting levers 15, 16, 17 and 18 are provided on the side of the machine facing the operator, and are associated, respectively, with the four denominational orders for which the machine is designed. The digit selecting levers are pivotally mounted within the housing and provided at their front ends with finger engaging portions 19, 20, 21 and 22 between which indicia indicating the digits from 1 to 9 are arranged.

The digit selecting levers 15 to 18 can be shifted into positions corresponding to any desired amount, for instance $12.17, by placing a finger into a finger engaging portion corresponding to the desired digit in each decimal order, and then depressing the respective digit selecting lever until the finger engages the control ledge 23 of the housing so that the indicia on the digit selecting lever indicating the selected digit is located directly above the control ledge 23.

Thereupon the release lever 24 is operated, and due to the automatic operation of the mechanism within the machine which will be described in greater detail later on, behind all three windows 11, 12 and 13 the selected number appears, in the present example 12.17.

Adjacent to the digit selecting levers 15 to 18, coin containers 25 to 31 are provided. The illustrated embodiment is adapted for German currency. The coin container 25 holds one pfennig coins, the coin container 26 holds two pfennig coins, the coin container 27 holds five pfennig coins, the coin container 28 holds 10 pfennig coins, the coin container 29 holds 50 pfennig coins, the coin container 30 holds one mark coins, and the coin container 31 holds two mark coins. It will be understood that a similar arrangement for holding American coins may be provided.

Underneath a partition 192, which separates the middle part of the housing 45 from the lower part 46, coin dispensing keys 32 to 38 are provided which are associated with the coin container arranged above the respective coin dispensing key. The bill dispensing keys 39 and 40 are arranged underneath the bill dispensing units B and C. Whenever one of the coin, or bill dispensing keys is operated the coin, or bill respectively of the dispenser associated with the respective key, dispenses a bill or a coin. The coins roll down an inclined surface 41 from the right to the left in Fig. 1 and are collected in a suitable dish 197. The bills drop to the bottom faces 42, and 43, respectively, from which they may be removed through suitable openings in the rear wall of the machine which faces the customer.

Every time a dispensing key is operated, the dispensed amount of money appears behind the window 12, or the dispensed amount of money is added to the amount already indicated at the indicating means behind the window 12.

In the following two examples of the operation of the machine will be given:

*Example 1*

A predetermined amount, for instance, German marks 12.17 are to be dispensed. For this purpose the ten mark dispensing key 40, the two mark dispensing key 38, the ten pfennig dispensing key 35, the five pfennig dispensing key 34, and the two pfennig dispensing key 33 are each pressed once. In the event that one of the required bills or coins is not stored in the currency containers, which can be ascertained from the outside, or in the event that it is preferred to dispense other coins as change, it is possible to operate other keys, for instance, to press the five mark key 39 twice, the one mark key 37 twice, the ten pfennig key 35 once, the two pfennig key 33 three times, and the one pfennig key 32 once.

In an operation of this type, and provided that the indicating means behind the window 12 were cleared to zero position by means of the clearing crank handle 14, the dispensed amount of currency will be indicated step by step as the dispensing keys are operated. If an amount was already registered on the indicating means behind window 12, each dispensed amount is added to the previously dispensed and indicated amount so that the total dispensed amount appears behind the window 12. After the dispensed amount of money is taken by the customer or operator, the machine is cleared so that the indicating means behind window 12 return to zero position.

Example 2

The customer has bought merchandise having a value of marks 13.42, and pays with a 20 mark bill. Consequently the customer is to receive the difference between 20.00 marks and 13.42 marks, which is 6.58 marks.

In this even first the amount of 13.42 is introduced into the machine by means of the digit selecting levers 15 to 18, and then transferred by operation of the release lever 24 to the three indicating means behind windows 11, 12 and 13 so that the operator can check the indication of the indicating means 11, 12, and the customer can check the indication of the indicating means 13.

The dispensing of the change which the customer is to receive is carried out in the following manner:

The operator consecutively presses a number of dispensing keys 32 to 40 in any desired order. During this operation, the dispensed amounts of currency are added on a totalizer associated with window 12 to the value of the purchase indicated by the indicating means behind window 12, and the operation is continued until the indicating means behind window 12 show the amount given by the customer to the cashier, in the particular example 20 marks. When this amount is indicated behind window 12, the difference between the amounts paid by the customer, and the amount of the purchase namely, marks 6.58 has been dispensed, and received by the customer.

In order to dispense the change required in the present example, the one pfennig key 32 is operated once, the two pfennig key 33 twice, the five pfennig key 34 once, the fifty pfenning key 36 once, the mark key 37 once and the five mark key 39 once.

In the event that several cash slips representing a purchase are presented, it is possible to add the amounts first on totalizers associated with windows 11, 12 and 13, and thereupon to proceed with dispensing the change.

In the above described example, the customer and the operator can check the indication of indicating means 11 and 12 which show the amount of the purchase. However, modified constructions are contemplated in which, for instance, the indicating means at 13 indicate the difference between the amount given by the customer to the cashier, and the amount of the purchase which is to be paid, in other words the amount of change. It is also possible to arrange two indicating means on the side of the machine facing the customer and to indicate simultaneously the amount of the purchase and the change due to the customer.

In order to take out of the machine a greater number of coins or bills, for instance, for removing all the money from the machine for checking the receipts after working hours, an arrangement is provided for dispensing continuously each type of coin or bill as long as the associated dispensing key is raised instead of being depressed. The coins and bills dispensed in such manner in a continuous operation are also added in the machine and indicated by the indicating means at 12 as described in Example 1.

The above description will clarify the general purpose and operation of the machine. The construction of the machine will now be described in detail with reference to the drawing, and more particularly with reference to Figs. 4 to 8. The arrangement for introducing a number representing the amount of a purchase will be described first.

The digit selecting levers 15 to 18 are arranged in the middle portion of the housing, as shown in Fig. 1. Only digit selecting lever 15 is shown in Figs. 4 and 5, which also show one coin container 25, the finger engaging portions 19 of the digit selecting lever 15, and the control ledge 23.

The arm 47 of the digit selecting lever 15 is fixedly connected with a disk 48 which is turnably mounted in the housing on a shaft 49. A second disk 50 is turnable on a shaft 51 and connected by means of a steel tape 193 to the disk 48 so that it turns together with same. A spring means 53 tends to turn the disk 50 in clock-wise direction in Figs. 4 and 5 so that the digit selecting lever 15 has to be depressed during operation against the action of spring means 53.

A first ratchet segment 54, best seen in Fig. 7, and a smooth segment 55 are rigidly connected to the disk 50 by means of a rivet 56. Furthermore, a second ratchet segment 57 is fixedly secured to the smooth segment 55 by a screw 58. The arrangement is such that the imaginary cylindrical surface defined by the points of the ratchet segment 57 coincides with the cylindrical surface of the smooth segment 55. As shown in Fig. 7, four disks 50 with the associated segments are turnably arranged on shaft 51 so that the number of the disks corresponds to the number of the digit selecting levers. A unit associated with one digit selecting lever and corresponding to one denominational order will be described hereinafter, and it will be understood that the other units associated with the other digit selecting levers and the denominational orders are similarly constructed.

A ratchet pawl lever 59 which is pivotally mounted on a shaft 60 cooperates with the first ratchet segment 54 and is pressed against the same by spring means 61. A link 63 is connected to the pawl lever 59 by means of a pin 62 on the pawl lever 59 which projects into an elongated slot in the link 63. The other end of link 63 is pivotally connected to a return lever 65 which is pivotally mounted on a shaft 66 and is urged by the spring means 67 to move downwardly. The free end of the return lever 65 is provided with a hook portion 68 which cooperates with a pin 71 provided on a disk 70 which is fixed to the shaft 69 of the clearance crank handle 14. When the clearance crank handle 14 is turned, the pin 71 engages the hoop portion 68 and pivots the return lever 65 upwardly about shaft 66.

A main operating lever 72 is pivotally connected to the return lever 65 by a pivot pin 73. A spring 74 urges the upper arm 77 of the operating lever 72 to the right in Figs. 4 to 6 so that the same engages an abutment 75 of an actuating slide member 76 which is slidably mounted in housing portion 44 for transverse movement and is urged by spring 200 to move to the right in Fig. 5 to its normal inoperative position.

The lower arm of the operating lever 72 supports a pivoted pawl 78 which cooperates with the second ratchet segment 57, while the end of operating lever 72 slides on the smooth surface of segment 55. The operating lever 72 is further provided with a pin 92 which projects into a recess in the fork-shaped end of the pawl 78 so that the pivotal movement of pawl 78 is limited.

A locking member 80 is turnably mounted on a shaft 79 and is urged by a spring means 81 to turn in counter-clockwise direction so as to engage a shoulder 82 on the return lever 65. The release lever 24 is pivotally mounted at 49 and is provided with a projection 84 in the region of its pivoting point. When the release lever 24 is depressed, the projection 84 engages the lower portion of the locking member 80 so that the same turns into the position shown in broken lines in Fig. 4.

The release lever 24 is connected to a coupling device D by a link 85 which has an elongated slot 86. The construction of the coupling device D will be described in greater detail hereinafter, but it should be understood that the coupling device effects a single complete revolution of a gear 97 whenever actuated by coupling gear 97 to a continuously rotating shaft 195. Gear 97 meshes with an intermediate gear 87 which is turnably mounted at 88 in the housing. The intermediate gear 87 meshes with a third gear 89 which is turnable about a shaft 90 and is connected for rotation to a cam disk 91 which has three cam lugs. In Fig. 4 the staggered cam lugs of the cam disks 91 of the other units associated with the other denominational orders are shown, but it will be understood that the cam disk of each unit has only three projecting cam lugs.

The ratio of transmission of the gears 97, 87 and 89 is 1:3 so that every time the coupling device D is actuated, the cam disk 91 turns three times which corresponds to a single revolution of the gear 97.

A roller 194 is arranged on the operating lever 72 which engages the cam disk 91 so that the operating lever 72 is oscillated when the cam disk 91 rotates. Oscillation of the operating lever 72 effects reciprocation of the actuating slide member 76 for actuating the totalizer devices E, F and G, which are cleared after each operation and the main totalizer device R, as will be described in greater detail hereinafter.

The operation for introducing a number representing the amount of a purchase will now be described.

Fig. 4 illustrates the initial position of a unit associated with one decimal order, the digit selecting lever 15 being in its uppermost position. The pawl 80 engages the shoulder 82 of the return lever 85 and holds the same in the illustrated upper position, so that due to the connection by the link 63, the pawl lever 59 and the main operating lever 72 are also in their upper positions. The pawl lever 59 and the pawl 78 are spaced from the associated ratchet segments 54 and 57 which are, together with smooth segments 55, in the extreme position shown in Fig. 4 in which the points of the pawls 59 and 78 are above and spaced from the outermost left end of the notched surface of the ratchet segments.

The digit selecting levers 15–18, and more particularly the digit selecting lever 15 are now operated to select the desired digits. Operation of the digit selecting levers turns the disks 50 through members 47, 48 193 together with the ratchet segments 54 and 57 and the smooth segments 55 counter clockwise in Fig. 4 until the pawl 78 and the pawl lever 59 are located above the ratchet tooth which corresponds to the digit selected in the respective order. If, for instance, the digit selecting lever 15 introduces the digit 5 in one decimal order, the fifth tooth of each of the two ratchet segments 54, 57 is underneath the pawls 78 and 59 as shown in Fig. 5. The upper arm 77 of the operating lever 72 is in its initial position between the two abutments 75 and 93 on the actuating slide member 76.

The release lever 24 is now depressed, and due to the elongated slot 86, the coupling device D is not released during the first part of the movement of the release lever 24. During this movement, the projection 84 engages the lower portion of the locking member 80 and turns the same in clockwise direction so that the shoulder 82 of return lever 65 is released as shown in Fig. 4. The lever system including levers 65, 72 and 59 is released, and the return lever 65 turns downwardly about the shaft 66 so that the pawl lever 59 rests upon the first ratchet segment 54, the pawl 78 rests upon the second ratchet segment 57, and the operating lever 72 rests upon the smooth segment 55, as best seen in Fig. 7. The operating lever 72 is now in its intermediate lowered position shown in Fig. 5 in which its upper arm 77 is still located between the abutments 75 and 93 of the actuating slide member 76.

When the release lever 24 is further depressed, the coupling device D is operated by means of the link 85 so that the gear 97 of the coupling device D performs a single complete revolution. Consequently, the cam disk 91 turns three times due to the transmission ratio of the gears 97, 87 and 89 so that the operating lever 72 is oscillated nine times since the roller 194 passes over the three cam lugs of the cam disk 91 during each of the three revolutions of the cam disk 91.

Due to the fact that the upper arm 77 of the operating lever 72 rocks in counter clockwise direction each time the roller 194 is engaged by a cam lug, the lower arm of the operating lever 72 together with the pawl 78 moves to the right in Fig. 4 and shifts the second ratchet segment 57 for one tooth pitch to the right. When the operating lever 72 oscillates in the opposite direction, the pawl 78 slides over the next tooth to the left and engages the next ratchet notch.

During such return movement the pawl 78 is held in its correct position due to the fact that the edge of the operating lever 72 slides on the smooth surface of the smooth segment 55. A movement of the segments during the return of the pawl 78 is prevented since the pawl lever 59 engages and locks the ratchet segment 54.

The shifting movement of the ratchet segments is repeated until the pawl 78 and the pawl lever 59 have engaged and shifted the last tooth of the ratchet segments, in the present example after five oscillations of the operating lever 72. The ratchet segments release the lever system when the pawls have passed over the last tooth of each segment so that the return lever 65 can drop into the position shown in Fig. 6. An elongated slot in the link 63 permits the pawl lever 59 to drop to a lower position engaging a shoulder on segment 54.

During the above described five oscillations of the operating lever 72, the upper arm 77 is located between the abutments 75 and 93 of the actuating slide member 76 and reciprocates the same so that the totalizers E, F, G, R are actuated and register the selected digit 5 in the respective decimal order. Totalizers E, F, G operate the indicating means behind windows 11, 12, 13. Since after five oscillating motions, the entire lever system drops to a lower position, the operating lever 72 and the upper arm 77 move downwardly and the arm 77 is now located in a recess 75a which permits oscillation of the operating lever 72 without effecting reciprocation of the actuated slide member 76 as shown in Fig. 6. Consequently, the remaining four oscillations of the operating lever 72 are ineffective and are only needed if the digit 9 is selected. The described arrangement obtains the result that the number of reciprocating motions of the actuating slide members 76, and thereby the actuation of the totalizers corresponds exactly to the digit selected by the respective digit selecting levers 15 to 18.

When the clearance crank handle 14 is turned, the disk 70 turns, and the pin 71 engages the hook portion 68 of the return lever 65 and pivots the return lever 65 upwardly so that the locking member 80 engages the shoulder 82 under the action of the spring 81, and the entire unit is returned to initial position as shown in Fig. 4.

It has been explained in the above description of the operation of the machine that the coupling device D is required to connect gear 97 to a driven shaft to perform a single revolution whenever actuated. The coupling device D will now be described in detail with reference to Figs. 9 to 12.

On a drive shaft 195, which is rotated by means which are not an object of the present invention, a ratchet wheel 96 is fixed by means of a key 95. The ratchet wheel has a hub which is extended in axial direction for turnably supporting a gear 97 and a casing 98 which encloses together with the gear 97 the ratchet wheel 96, and is secured to the gear 97 by a screw 99.

The casing 98 is formed with an opening in which a locking means 100 is arranged. The locking means 100 is composed of a ratchet pawl 101, a stop arm 102, and an abutment 103, and is pivotally mounted on the casing 98 by means of a pin 104. A leaf spring 105 is connected to the locking means 100 and to the casing 98 and urges the locking means 100 to turn in counter clockwise direction in Figs. 9 to 11 so that the stop arm 102 tends to move away from the stop 106 and the ratchet pawl 101 tends to engage the ratchet wheel 96.

The previously described link 85 is shown in Figs. 9 to 11 to be pivotally connected at 108 to a bracing lever 107 which in the inoperative position shown in Fig. 9 is spaced from the locking means 100. A locking lever 110 which is pivotally mounted at 111 is provided with a pin 109 which engages an elongated slot in the bracing lever 107. The spring 112 which abuts at 113 against a fixed portion of the housing, urges the locking lever 110 to turn in counter clockwise direction. A tension spring 114 is secured to the bracing lever 107 and to the locking lever 110 and tends to move the two levers apart. A pin 115 serves as a stop for the locking lever 110, and as a supporting abutment for the bracing lever during the operation of the coupling device as will be explained hereinafter.

The operation of the coupling device D is as follows:

In the position shown in Fig. 9 the drive shaft 195 is rotated, and the ratchet wheel 96 rotates therewith without engaging the locking means 100 which abuts with the abutment 103 against a shoulder 148 of the locking lever 110 and is held on the stop 106 against the action of the spring 105.

When the link 85 is moved upwardly during the previously described operation of the release lever 24 into the position shown in Fig. 10, one end of the bracing lever 107 rests upon the upper portion of the abutment 103 of the locking means 100, so that lever 107 turns and takes along the locking lever 110 to move in clockwise direction so that the abutment 103 of the locking means 100 is released. In this position the spring 105 urges the locking means 100 into a position in which the pawl 101 engages a tooth of the ratchet wheel 96 so that the locking means is connected for rotation to the ratchet wheel 96, and the gear 97 and the casing 98 rotate with the drive shaft 195. Fig. 11 shows the position of the elements after the first part of the rotation.

If the link 85 is released in this position, the locking lever 110 is pressed by the spring 112 into the position shown in Fig. 9 until the stop 115 engages it, and the abutment 103 of the locking means 100 engages the shoulder 148 so that the coupling device is released.

In the event that the link 85 is held in its upper position shown in Fig. 10 for an extended time, the locking lever 110 can nevertheless return under the action of spring 112 into the position shown in Fig. 9, with the pin 109 sliding in the elongated slot of the transfer lever 107. This position is shown in broken lines in Fig. 11.

It will be apparent from the description of the coupling device D that the locking means 100, the casing 98 and the gear 97 perform only a single revolution when the link 85 is shifted by the release lever 24 so that the gear 97 through gears 87 and 89 effects three rotations of the cam disk 91.

As shown in Figs. 12 and 13, a plurality of similarly constructed coupling devices is mounted on the driven shaft 195 in addition to coupling device D, namely the coupling devices H, J, K, L, M, N, O, P and Q, the arrangement being such that the drive shaft 195 rotates all ratchet wheels 96 of the respective coupling devices.

Each of the coupling devices H to Q is associated with one of the dispensing keys 32 to 40, which are arranged on corresponding levers 196. Levers 196 are pivotally mounted on pins 149, see Fig. 4, and pivotally connected to a link member 117 to which a bracing lever 107 is pivoted. The operation of the bracing levers 107 has been described with reference to Figs. 9 to 12.

The coupling devices H to Q operate cam disks 118 to 126 which are threadedly connected by screws 127 to the casings 98. The cam disks 118 to 126 are freely rotatable on the drive shaft 195, see Fig. 12 and Fig. 13.

Each of the cam disks 118 to 126 is provided with a plurality of cam lugs whose number corresponds to values of the respective currency type in the associated denominational order. For instance, the 1 pfennig cam disk 118 has one cam lug, the 2 pfennig cam disk 119 has two cam lugs, the 5 pfennig cam disk 120 has five cam lugs, the 10 pfennig cam disk 121 has one cam lug, the 50 pfennig cam 122 has five cam lugs, the 1 mark cam disk 123 has one cam lug, the 2 mark cam disk 124 has two cam lugs, the 5 mark cam disk 125 has five cam lugs, and the 10 mark cam disk 126 has one cam lug.

Each cam disk 118 to 126 is provided with a recess in which an arresting roller 128 rests when the coupling device is not operated. Rollers 128 are turnable mounted on rocking levers 129 and hold the coupling device against undesired turning under the action of spring 105.

The rocking levers 129 of the coupling devices associated with the same decimal order are arranged on a common shaft. Consequently the rocking levers 129 of the coupling devices H, J, K are mounted on a shaft 130 (pfennig units), the rocking levers of the coupling devices L and M are mounted on a shaft 131 (10 pfennig), the rocking levers of the coupling devices N, O and P are mounted on a shaft 132 (mark units) and the rocking lever of the coupling device Q is mounted on a shaft 133 (10 marks). Each rocking lever 129 is freely turnable on the associated shaft. The shafts 130 to 133 are coaxially arranged, connected by pins 150 which project into corresponding recesses in the adjacent shafts and supported for rotation on bearings 134. Each rocking lever 129 has a pin 135 which has a flat abutment face engaging the associated transfer lever 136 which is fixedly connected to the respective shaft 130 to 133 by means of a pin 137 as shown in Fig. 14. A link 138 is fixedly secured by a pin 139 to each of the shafts 130 to 133 and is connected to a connecting link 140 also shown in Figs. 4 and 5. The connecting link 140 is connected to a bell crank lever 141, 142 what is turnably supported at 143 and is composed of a substantially horizontal arm 141 and a substantially vertical arm 142 as shown in Fig. 6. The end 145 of arm 142 is located in space 146 of the actuating slide member 76 formed between the abutment 93 and an abutment 147 of a slide bar 151 which is mounted on the actuating slide member 76 slidable in longitudinal direction of the same. A spring 198 urges the slide bar 151 to the right in Figs. 4 and 6 so that the right hand end 152 of the slide bar 151 engages a fixed abutment 153 on the actuating slide member 76. Movement of arm 142 to the left shifts the slide bar 151 into a position engaging and operating the totalizer E. When actuating slide member 76 is moved to the left by operating lever 72, abutment 153 also moves slidable member 151 to the left for actuating totalizer E.

In the illustrated embodiment of the present invention, four motion transmitting means of the above described type, including four bell crank levers 141, 142 and four slide bars 151 are provided, and correspond to the four decimal orders of the maximum amount for which the machine is designed.

The operation of the above described motion transmitting means is as follows:

When a dispensing key lever 196 is moved into the position I shown in Fig. 5 by depressing a currency dispensing key 34, five pfennig are dispensed, and simultaneously the coupling device K, see Fig. 13, associated with the respective key 34 and lever 196 is released through the link 117 and the bracing lever 107 so that the associated cam disk 120 performs one complete revolution. The respective cam disk 120 has five cam lugs and consequently raises the roller 128 and the rocking lever 129, which freely turns about shaft 130, five times during the single revolution permitted by the coupling device. The pin 135 rocks the transfer lever 136 and turns the shaft 130 together with the link 138 through predetermined angle. Due to the rocking movement of the transfer lever 138 the bell crank lever 141, 142 is turned about the shaft 143 in counter-clockwise direction so that the end of the lever arm 142 shifts the slide bar 151 to the left in Figs. 4, 5 and 6 whereby the totalizer unit E is actuated. Altogether five shifting movements take place, and the slide bar 151 each time returns to its initial position due to the action of the spring 198, The slide bar 151 engages the abutment 153 of the actuating slide member 76 without shifting same so that the totalizers F, G and R are not operated.

The rocking movements of the rocking levers 129 of the 1 pfennig coupling device H and 2 pfennig coupling device J are transferred through the same shaft 130 to the totalizer E in the same manner as the movements of rocking lever 129 of the 5 pfennig coupling device K. Cam 118 of coupling device H has one lug, and cam 119 of coupling device J has two lugs. Consequently, during each revolution of coupling devices H and J, shaft 130 is rocked once or twice, respectively. This results in movements of members 138, 141, 142, 151 as described for coupling device K so that totalizer E is actuated to register a number of "pfennig units" corresponding to the number of effective cam lugs, and all pfennig amounts of the lowest decimal order are added.

The coupling devices L and M, associated with 10 and 50 pfennig, and the coupling devices N, O and P associated with "mark" coins each have a common shaft 131, and 132, respectively and a common motion transmitting system which is operated in a similar manner. The coupling device Q, associated with "10 mark" coins has its own shaft 133.

As previously mentioned, a device for dispensing coins is provided which is operated by dispensing keys 32 to 38 and will now be described in detail.

Each coupling device includes a gear 97 which meshes with a gear 155 which is turnably mounted on a support 154. A connecting rod 156 is pivotally connected at 157 to each gear 155 as best seen in Figs. 4 and 5.

The coin dispensing device, illustrated in Figs. 15 to 18, is operated by the connecting rod 156. A dispensing member 164 is pivotally connected by means of a fork-shaped member 158 to the connecting rod 156, and is pivotally connected by a pin 159 to a slidable member 160. The dispensing member 164 is provided with an elongated slot 161' into which the pin 161 of the slidable member 160 projects. Consequently, the dispensing member 164 can perform a limited pivotal movement while the pin 161 moves in the slot 161'.

The slidable member 160 is slidably mounted between pairs of rails 199 which are fixedly secured to the housing and is laterally guided by rails 162, as best seen in Fig. 18. The upper rail 199 constitutes a support for the coins and is arranged spaced from the coin container 25 so that a slot 163 for the ejection of coins remains free between rail 199 and coin container 25.

The dispensing of coins takes place as follows:

When one of the dispensing keys 32 to 38 is depressed into the position I, the gear 97 of the associated coupling device performs a complete revolution, and turns the gear 155 through 360°. Thereby, the connecting rod 156 performs one rearward and one forward stroke so that the dispensing member 164 is once retracted and then returned to its initial forward position shown in Fig. 15. Retraction of the dispensing member 164 effects a pivotal movement of its lip portion 165 in a downward direction as best seen in Fig. 16, so that the lip 165 of the dispensing member 164 releases the lowermost coin at the start of the movement of the dispensing member 164 to its retracted position. During the movement of the slidable member 160 on the rail 162 to the position shown in Fig. 17, the dispensing member 164 does not engage the coins.

In the position shown in Fig. 17 in which the dispensing member 164 is completely retracted, the connecting rod does not pull the dispensing member 164 any more, but starts pushing it to the left in Fig. 17 so that the dispensing member 164 is pivoted back to its upper position so that the lip 165 engages the rear edge of the lowermost coin, and ejects the coin through the opening 163. After the gear 155 has completed one revolution, the dispensing member 164 remains in the position shown in Fig. 15 in which the coin container is closed.

The above described coin dispensing arrangement avoids any unnecessary movement of the superimposed coins and assures a smooth and rapid feeding and dispensing of the coins. Consequently the dispensing device can be operated at a high speed.

When it is desired to check the contents of the machine and to count all the money stored therein, it is preferable to perform the dispensing operations in rapid succession, instead of depressing a key each time a coin is dispensed. According to a preferred embodiment of the present invention the dispensing keys, for instance, the key 34 cannot only be depressed into the position I as above described, but can also be raised into the position II shown in dash and dot lines in Fig. 5. In this position of the key 32 and of the lever 196, the rear end of the lever 196 moves downwardly and pulls through link 117 the lever 107 into the position shown in dash and dot lines in Fig. 10 in which the locking means 100 engages the ratchet wheel 96 so that the gear 97 rotates continuously as long as the key 32 is raised. It will be understood that continuous rotation of the gear 97 will effect a continuous reciprocation of the connecting rod 156 and consequently actuation of the dispensing member 164 in rapid succession so that all coins in the coin container are successively ejected, whereupon the key 34 is released to return to its normal position.

As previously mentioned, a plurality of corresponding totalizer units is provided, and the totalizer unit F will now be described with reference to Figs. 19 to 22.

Each actuating slide member 76 is provided on both sides with supporting plates 170 which are secured by rivets 166. A pawl 168 is pivotally mounted on the supporting plates 170 by means of a pin 167 and is pressed by a leaf spring 169 against a stepping wheel 171. Stepping wheel 171, a tens-transfer wheel 172, a number wheel 173 constituting an indicating means behind window 11, and a further stepping wheel 174 are fixed to a sleeve member 175 which is turnably mounted on a shaft 176 so that the wheels 171, 172, 173, and 174 constitute a rotatable unit. The tens-transfer wheel 172 is provided with a transfer projection 188.

A pawl 177 having the same shape as the pawl 168 engages the stepping wheel 174 and is pivotally mounted on a pin 179 which is secured to an angular lever 178 which is pressed by a spring 180 against the stepping wheel 174, see particularly Fig. 19. The angular lever 178 is turnably mounted on a shaft 181 and is urged by the spring 182 against a stop 187. An arresting lever 183 is also mounted for pivotal movement on the shaft 181 and is urged by spring 185 into a position in which the arresting roller 184 which is turnable on pin 186, engages a notch of the stepping wheel 171.

The transfer projection 188 of the tens-transfer wheel 172 cooperates with a projection 191 of the angular lever 178. The projection 191 is provided on a plate 189 which is secured by rivets 190 to a lateral face of the angular lever 178.

The operation of the totalizer unit F is as follows:

During each stroke of the actuating slide member 76, effected by operation of a digit selecting lever 15 to 18, the pawl 168, see Fig. 22, shifts the associated stepping wheel 171 for one step corresponding to the tooth pitch. The roller 184 jumps into the notches of the stepping wheel 171 and assures an accurate positioning of the stepping wheel. The abutment 203 of the plates 170 prevents shifting of the stepping wheel for two steps, by engaging a face of the next following tooth.

The tens-transfer wheel 172 turns together with the stepping wheel 171, and after nine steps the transfer projection 188 of the tens-transfer wheel 172 engages the projection 191 of the angular lever 178 so that the same moves away from stop 187 against the action of the spring 182, as shown in Fig. 20, and is shifted for a distance corresponding to one step of the stepping wheel. At the end of such movement of the angular lever 178, the projection 191 is again released by the transfer projection 188 so that the angular lever 178 returns to its normal position shown in Fig. 21. The pawl 177 which is mounted on the angular lever 178 follows the rocking movement of the angular lever 178 and shifts the adjacent cooperating stepping wheel 174, which already belongs to the next higher decimal order, one step so that each ten units are transferred to the next higher order. All number wheels are connected in a similar manner so that a complete revolution of one stepping wheel effects shifting of the adjacent stepping wheel of the next higher denominational order for a single step corresponding to one unit of the respective denominational order.

The above described arrangement for shifting the number wheel of the next higher order makes it possible to shift any one of the stepping wheels without disturbing the correct addition. Moreover, two adjacent number wheels are coupled only for a short period corresponding to a tenth part of a complete revolution, or 36°, and are turnable independently of each other during the remaining period.

The above description of the structure of the currency dispensing apparatus according to the present invention, will make it evident that the digit selecting levers 15 to 18, the release lever 24, the coupling device D, the gear transmission 97, 87, 89, the main operating lever 72, and the actuating slide 76 constitute first operating means for introducing into the totalizer means E, F, G a first amount corresponding to the amount of the purchase. The number wheels 173 of the totalizers F and G constitute indicating means for indicating this first amount.

The keys 32 to 38, the levers 196, the links 117, the coupling devices H to Q, the links 140, the bell crank levers 141, 142, and the slidable members 151 constitute second operating means for introducing into the totalizer E a second amount, which is added in totalizer E to the first amount so that totalizer E registers a third amount which is indicated by second indicating means, namely the number wheels 173 of the totalizer E.

The currency dispensing means, including gear 155, connecting rod 156, dispensing member 164, and containers 25 to 31, are connected to the second operating means due to the fact that the gears 155 mesh with the gears 97 of the coupling devices H to Q, so that the currency dispensing means are operated when the second operating means actuate the totalizer E.

It will be understood that each of the elements described above, or two or more together, may also find a useful application in other types of currency dispensing and adding machines differing from the types described above.

While the invention has been illustrated and described as embodied in a combined currency dispensing and totalizing machine including indicating means and a totalizer means for adding the dispensed amount to a previously introduced number, it is not intended to be limited to the details shown, since various modifications and structural changes may be made without departing in any way from the spirit of the present invention.

For instance, a modified embodiment is contemplated according to which the amount of the purchase and the amount given by the customer to the cashier are introduced into a totalizer which automatically subtracts the amount of the purchase from the amount received from the customer. The difference registered by the totalizer is automatically transferred to the currency dispensing means so that the same dispense the change due to the customer.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; a plurality of intermediate shafts, each shaft associated with one denominational currency order; a plurality of linkage means connecting the other parts of said coupling devices with said intermediate shafts for rocking the same so that each of said intermediate shafts rocks whenever one of said operating means is actuated; at least one totalizer including indicating means; a plurality of motion transmitting means connecting said intermediate shafts with said totalizer so that said totalizer adds in each denominational order all currency types dispensed by said currency dispensing means in the respective currency order; and connecting means connecting said other parts of said coupling devices with said currency dispensing means so that the same are operated by said operating means.

2. A currency dispensing apparatus as claimed in claim 1 wherein said connecting means include gear means connected for rotation to said other parts of said coupling devices; and connecting rod means connected to said gear means so as to be reciprocated by the same, one gear means and one connecting rod means being associated with each of said currency dispensing means for operating the same.

3. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; a plurality of intermediate shafts, each shaft associated with one denominational currency order; a plurality of linkage means connecting the other parts of said coupling devices with said intermediate shafts for rocking the same so that each of said intermediate shafts rocks whenever one of said operating means is actuated, each of said linkage means including a cam disk connected for rotation to one of said other parts, each cam disk having a number of cam lugs corresponding to the value of a currency type within a denominational currency order so that the associated intermediate shaft is rocked a number of times corresponding to the number of said cam lugs; at least one totalizer including indicating means; a plurality of motion transmitting means connecting said intermediate shafts with said totalizer, each motion transmitting means including a slidable member for actuating said totalizer, each of said slidable members being reciprocated the same number of times as the respective intermediate shaft is rocked so that said totalizer adds in the each denominational order all currency types dispensed by said currency dispensing means in the respective currency order; and connecting means connecting said other parts of said coupling devices with said currency dispensing means so that the same are operated by said operating means.

4. A currency dispensing apparatus as claimed in claim 3 wherein each of said motion transmitting means includes a pivoted bell crank lever connected at one end to one of said intermediate shafts for being rocked by the same, and connected at the other end to one of said slidable members for reciprocating the same.

5. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; a plurality of intermediate shafts, each shaft associated with one denominational currency order; a plurality of linkage means connecting the other parts of said coupling devices with said intermediate shafts for rocking the same so that each of said intermediate shafts rocks whenever one of said operating means is actuated; at least one totalizer including indicating means; a plurality of motion transmitting means connecting said intermediate shafts with said totalizer so that said totalizer adds in the each denominational order all currency types dispensed by said currency dispensing means in the respective currency order; connecting means connecting said other parts of said coupling devices with said currency dispensing means so that the same are operated by said operating means; and other operating means for introducing values into said totalizer independently of said currency dispensing means.

6. Currency dispensing apparatus as claimed in claim 5 wherein said other operating means include a plurality of digit selecting levers, each digit selecting lever associated with one denominational currency order; an actuating slide member connected to said totalizer for actuating the same independently of said motion transmitting means; and means connecting said digit selecting levers with said actuating slide member, and including cam means for reciprocating said actuating slide member a number of times corresponding to a digit selected by one of the digit selecting levers.

7. Currency dispensing apparatus as claimed in claim 6 and comprising at least one other totalizer actuated by said actuating slide member, and including indicating means for indicating a number introduced into said other totalizer by said digit selecting levers.

8. A currency dispensing apparatus as claimed in claim 3 and including at least one other totalizer; a reciprocable actuating slide member cooperating with said two totalizers for actuating the same, and slidably supporting said slidable member for movement between an advanced and a retracted position; abutment means on said actuating slide member engaging said slidable member; spring means urging said slidable member against said abutment means in one direction into said retracted position so that both said totalizers are actuated when said actuating slide member moves in an opposite direction and moves said slidable member to said advanced position, but only said one totalizer is actuated when said slidable member moves in said opposite direction away from said abutment means; a plurality of digit selecting levers, each digit selecting lever associated with one denominational order; and connecting means connecting said digit selecting levers with said actuating slide member and including cam means for reciprocating said actuating slide member, and whereby said slidable member is moved in said other direction a number of times corresponding to a digit selected by one of said digit selecting levers.

9. A currency dispensing apparatus as claimed in claim 8 wherein said connecting means include ratchet means operated by said digit selecting levers so as to be shifted for a number of teeth corresponding to the number of the selected digits.

10. A currency dispensing apparatus as claimed in claim 9 and including a drive means; and wherein said connecting means include a coupling device connected to said drive means; a release lever for shifting said coupling device between a coupling position and a releasing position; an operating lever engaging said actuating slide member and said cam means and being rocked by said cam means when said coupling device is in coupling position.

11. A currency dispensing apparatus as claimed in claim 10 wherein said operating lever is movable between an operative position positively engaging said actuating slide member and an inoperative position; wherein said cam means have at least nine cam lugs; and wherein said operating lever moves to said inoperative position after said ratchet means has been shifted a number of teeth corresponding to a selected digit.

12. A currency dispensing apparatus as claimed in claim 11 and including a third totalizer operated by said actuating slide member; a set of indicating means each indicating means connected to and operated by one of said totalizers, the indicating means associated with said other totalizer and with said third totalizer facing in opposite directions so as to be adapted to be viewed by a customer and by the operator of the apparatus.

13. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; a plurality of intermediate movable means, each movable means associated with one denominational currency order; a plurality of linkage means connecting the other parts of said coupling devices with said intermediate movable means for moving the same so that each of said intermediate movable means moves whenever one of said operating means is actuated; at least one totalizer including indicating means; a plurality of motion transmitting means connecting said intermediate movable means with said totalizer so that said totalizer adds in each denominational order all currency types dispensed by said currency dispensing means in the respective currency order; and connecting means connecting said other parts of said coupling devices with said currency dispensing means so that the same are operated by said operating means.

14. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; a plurality of intermediate movable shafts, each movable shaft associated with one denominational currency order; a plurality of linkage means connecting the other parts of said coupling devices with said intermediate movable shafts for moving the same so that each of said intermediate movable shafts moves whenever one of said operating means is actuated; at least one totalizer; a plurality of motion transmitting means connecting said intermediate movable shafts with said totalizer so that said totalizer adds in each denominational order all currency types dispensed by said currency dispensing means in the respective currency order; and connecting means connecting said other parts of said coupling devices with said currency dispensing means so that the same are operated by said operating means.

15. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; connecting means connecting said other parts of said coupling devices with said currency dispensing means so that the same are operated by said operating means; at least one totalizer; and a plurality of motion transmitting devices respectively associated with different denominational currency orders and connecting said other parts of said coupling devices with said totalizer for actuating said totalizer to add in each denominational order all currency types dispensed by said currency dispensing means in the respective currency order.

16. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; connecting means connecting said other parts of said coupling devices with said currency dispensing means so that the same are operated by said operating means; at least one totalizer; a plurality of motion transmitting devices respectively associated with different denominational currency orders and connecting said other parts of said coupling devices with said totalizer for actuating said totalizer to add in each denominational order all currency types dispensed by said currency dispensing means in the respective currency order; and other operating means for introducing values into said totalizer independently of said currency dispensing means, said other operating means including a plurality of digit selecting members, each digit selecting member being associated with one denominational currency order, an actuating member connected to said totalizer for actuating the same independently of said motion transmitting devices, and means connecting said digit selecting members with said actuating member for operating the same by said digit selecting members.

17. Currency dispensing apparatus comprising, in combination, a plurality of currency dispensing means, each currency dispensing means being associated with a currency type within a denominational currency order; a plurality of operating means, each operating means being associated with one of said currency dispensing means; drive means; a plurality of coupling devices, each coupling device including two parts, each coupling device being connected to one of said operating means for being moved between a coupling position in which said parts are coupled, and a released position, one of said parts being connected to and driven by said drive means; connecting means connecting said other parts of said coupling devices with said currency dispensing means so that the same are operated by said operating means; at least one first totalizer; at least one second totalizer; indicating means connected to said totalizers; a plurality of motion transmitting devices respectively associated with different denominational currency orders and connecting said other parts of said coupling devices with said first totalizer for actuating said first totalizer to add in each denominational order all currency types dispensed by said currency dispensing means in the respective currency order; and other operating means for introducing values into said totalizers independently of said currency dispensing means, said other operating means including a plurality of digit selecting members, each digit selecting member being associated with one denominational currency order, an actuating mmeber connected to said totalizers for actuating the same independently of said motion transmitting devices, and means connecting said digit selecting members with said actuating member for operating the same by said digit selecting members.

18. Currency dispensing apparatus comprising, in combination, a plurality of currency dispensing means, each currency dispensing means being associated with a currency type within a denominational currency order; a plurality of operating means, each operating means being associated with one of said currency dispensing means; rotary drive means; a plurality of rotary coupling devices, each coupling device including two parts, each coupling device being connected to one of said operating means for being moved between a coupling position in which said parts are coupled, and a released position, one of said parts being connected to and driven by said drive means; connecting means connecting said other parts of said coupling devices with said currency dispensing means so that the same are operated by said operating means; at least one totalizer; and a plurality of motion transmitting devices respectively associated with different denominational currency orders and connecting said other parts of said coupling devices with said totalizer, each motion transmitting device including a reciprocable actuating member for actuating said totalizer and a cam disk connected for rotation to one of said other parts, each cam disk having a number of cam lugs corresponding to the value of a currency type within a denominational currency order, said cam disks being operatively connected to said actuating member for reciprocating the same a number of times corresponding to the number of said cam lugs for actuating said totalizer to add in each denominational order all currency types dispensed by said currency dispensing means in the respective currency order.

References Cited in the file of this patent

UNITED STATES PATENTS

| | | |
|---|---|---|
| 960,759 | Wolff | June 7, 1910 |
| 1,034,500 | Von Pein | Aug. 6, 1912 |
| 1,084,608 | Chiger | Jan. 20, 1914 |
| 1,107,269 | Dement | Aug. 18, 1914 |
| 1,115,849 | Maier | Nov. 3, 1914 |
| 1,279,053 | Werner | Sept. 17, 1918 |